(12) United States Patent
Jeffrey et al.

(10) Patent No.: US 11,992,752 B2
(45) Date of Patent: May 28, 2024

(54) INPUT APPARATUS FOR A GAMES CONSOLE

(71) Applicant: Ironburg Inventions Limited, Wincanton (GB)

(72) Inventors: Carl Jeffrey, Cheltenham (GB); Duncan Ironmonger, Milton, GA (US)

(*) Notice: Subject to any disclaimer, the term of this patent is extended or adjusted under 35 U.S.C. 154(b) by 229 days.

(21) Appl. No.: 17/620,194

(22) PCT Filed: Jun. 19, 2020

(86) PCT No.: PCT/GB2020/051493
§ 371 (c)(1),
(2) Date: Dec. 17, 2021

(87) PCT Pub. No.: WO2020/254824
PCT Pub. Date: Dec. 24, 2020

(65) Prior Publication Data
US 2022/0241681 A1   Aug. 4, 2022

Related U.S. Application Data

(60) Provisional application No. 62/863,321, filed on Jun. 19, 2019.

(51) Int. Cl.
| | | |
|---|---|---|
| *A63F 13/213* | (2014.01) | |
| *A63F 13/214* | (2014.01) | |
| *A63F 13/24* | (2014.01) | |

(52) U.S. Cl.
CPC .......... *A63F 13/213* (2014.09); *A63F 13/214* (2014.09); *A63F 13/24* (2014.09)

(58) Field of Classification Search
CPC ...... A63F 13/213; A63F 13/214; A63F 13/24; A63F 13/98
See application file for complete search history.

(56) References Cited

U.S. PATENT DOCUMENTS

| | | | |
|---|---|---|---|
| 2013/0012319 A1* | 1/2013 | Negroponte | ............ A63F 13/92 463/37 |
| 2013/0040737 A1 | 2/2013 | Raghoebardajal et al. | |
| 2013/0154958 A1* | 6/2013 | Clavin | .................. G06F 1/1632 345/173 |
| 2014/0018173 A1* | 1/2014 | Urhman | .................. A63F 13/24 463/37 |

(Continued)

OTHER PUBLICATIONS

Wikipedia: "Playstation Vita," URL: https://en.wikipedia.org/w/index.php?title=Playstation_Vita&oldid=899424563 (May 29, 2019).

(Continued)

*Primary Examiner* — James S. McClellan
(74) *Attorney, Agent, or Firm* — Walters & Wasylyna LLC

(57) ABSTRACT

The invention provides an improved controller (10) for a games console. The invention is a games controller (10) that is intended to be held by a user in both hands in the same manner as a conventional controller. The controller of the invention (10) may comprise a plurality of controls (2, 3, 4, 5, 6, 8, 9) on the front (F) and top (T) of the controller (10). The controller of the present invention (10) is advantageous as it additionally comprises at least one additional control (18) providing a distal input control device having an interface located in one of a plurality of faces of the controller.

20 Claims, 7 Drawing Sheets

(56) References Cited

U.S. PATENT DOCUMENTS

| | | |
|---|---|---|
| 2015/0105152 A1 | 4/2015 | Bellinghausen et al. |
| 2016/0232675 A1* | 8/2016 | Ogasawara ........... A63F 13/213 |
| 2017/0220102 A1* | 8/2017 | Kim ....................... H04N 23/60 |
| 2018/0207523 A1* | 7/2018 | Lyden .................... A63F 13/214 |
| 2019/0118080 A1* | 4/2019 | Campbell ............... A63F 13/24 |

OTHER PUBLICATIONS

Mike Williams: "Nintendo Switch Patents Show off Touchscreen, Alternate Joy Cons, NFC, SC Card Slot, and IR Camera," *USgamer*, URL: https://www.usgamer.net/articles/nintendo-switch-patents-point-to-a-touch-screen-alternative-joy-cons-nfc-sd-card-slot-and-ir-camera (Dec. 15, 2016).

\* cited by examiner

INPUT APPARATUS FOR A GAMES CONSOLE

This application is the U.S. national stage entry under 35 U.S.C. § 371 of Intl. Pat. App. No. PCT/GB2020/051493 filed on Jun. 19, 2020, which claims priority from U.S. Ser. No. 62/863,321 filed on Jun. 19, 2019. The entire contents of Intl. App. No. PCT/GB2020/051493 and U.S. Ser. No. 62/863,321 are incorporated herein by reference.

FIELD

The present invention relates to an input apparatus for a computer, such as, but not limited to, a games console, more particularly, but not exclusively the invention relates to, a handheld controller for a games console.

BACKGROUND

Controllers for most current game consoles are generally intended to be held and operated by the user holding the controller in both hands, such controllers are sometime referred to as "gamepads". A conventional controller will generally comprise a hard-outer case with a plurality of controls mounted about the controller. Typically, the controls include buttons, analogue control sticks, bumpers and triggers and are provided upon the front or the top of the controller.

An object of the present invention is to provide a controller having at least one additional control mounted to the controller. It is desirable that the controller is ergonomic, that a user can comfortably operate the control. It is also desirable that the additional control is readily accessible.

The present invention seeks to overcome or at least mitigate the problems of the prior art.

SUMMARY

A first aspect of the present disclosure provides an input apparatus for a computer. The apparatus comprises an outer case having a plurality of faces including a front face and a top face. The apparatus comprises a plurality of controls located on the front face and the top face of the apparatus. The apparatus is shaped to be held in both hands of a user such that the user's thumbs are positioned to operate controls located on the front of the apparatus and the user's index fingers are positioned to operate controls located on the top of the apparatus. The apparatus further comprises at least one distal input control device comprising an interface located in one of the plurality of faces of the apparatus.

Optionally, the interface of the distal input control device comprises a sensing surface of a touch sensitive device.

Optionally, the apparatus comprises a touch sensitive device having a sensing surface.

Optionally, the interface of the distal input control device is located at least in part within the sensing surface.

Optionally, the interface of the distal input control device is located in registry with the sensing surface.

Optionally, the interface of the distal input control device is located internally of the sensing surface.

Optionally, the interface of the distal input control device is disposed below the sensing surface.

Optionally, the at least one distal input control device comprises a camera having an image sensor for capturing at least one image and an image analyzer.

Optionally, the at least one distal input control device comprises a first distal gesture recognition device.

Optionally, the touch sensitive device comprises a second proximal gesture recognition device.

Optionally, the at least one distal input control device is detachable from the apparatus.

Optionally, the input apparatus comprises a communication device providing a communications link between the apparatus and the at least one distal input control device.

Optionally, the touch sensitive device is detachable from the apparatus.

Optionally, the input apparatus comprises a communication device provides a communications link between the apparatus and the touch sensitive device.

Optionally, the apparatus is a games console controller for controlling a game program.

Optionally, the apparatus is a game pad.

Optionally, the apparatus comprises a removable cover.

Optionally, the at least one distal input control device is mounted to the removable cover.

Optionally, the removable cover inhibits operation of the at least one distal input control device.

Optionally, the removable cover disables operation of the at least one distal input control device.

Optionally, the removable cover comprises a window enabling operation of the at least one distal input control device.

Optionally, the apparatus comprises a plurality of distal input control devices each comprising an interface and a camera located and oriented to provide a plurality of fields of view. The camera comprises an image sensor for capturing at least one image of a respective one of the plurality of fields of view. The apparatus may further comprise an image analyzer.

A second aspect of the present disclosure provides an input apparatus for a computer. The apparatus comprises an outer case having a plurality of faces including a front face and a top face. The apparatus comprises a plurality of controls located on the front face and the top face of the apparatus. The apparatus is shaped to be held in both hands of a user such that the user's thumbs are positioned to operate controls located on the front of the apparatus and the user's index fingers are positioned to operate controls located on the top of the apparatus. The apparatus further comprises a touch sensitive device having a sensing surface and at least one distal input control device comprising an interface located in one of the plurality of faces of the apparatus and wherein the interface comprises at least a portion of the sensing surface.

A third aspect of the present disclosure provides an input apparatus for a computer. The apparatus comprises an outer case having a plurality of faces. The apparatus may comprise a touch sensitive device having a sensing surface provide in one of the plurality of faces. The apparatus may comprise a distal input control device comprising an interface located in one of the plurality of faces of the apparatus and wherein the interface comprises at least a portion of the sensing surface. The apparatus may comprise a communication device providing a communications link between the apparatus and a computer.

A fourth aspect of the present disclosure provides a handheld controller for a video games console. The controller comprises an outer case having a plurality of faces including a front face and a top face. The controller comprises a plurality of controls located on the front face and the top face of the controller. The controller is shaped to be held in both hands of a user such that the user's thumbs are positioned to operate controls located on the front of the controller and the user's index fingers are positioned to operate controls located on the top of the controller. The controller further comprises a touch sensitive device having a sensing surface and at least one distal input control device comprising an interface located in one of the plurality of faces of the controller and wherein the interface comprises at least a portion of the sensing surface.

A fifth aspect of the present disclosure provides a module for a handheld controller of a video games console. The module comprises an outer case having a plurality of faces. The module comprises a touch sensitive device having a sensing surface provide in one of the plurality of faces. The module comprises a distal input control device comprising an interface located in one of the plurality of faces of the apparatus and wherein the interface comprises at least a portion of the sensing surface. The module comprises a communication device providing a communications link between the controller and a module.

A sixth aspect of the present disclosure provides use of an input apparatus according the foregoing paragraphs, wherein the input apparatus is held in at least one hand of a user and the user provides a remote input with a body part which is detected by the distal input control device so as to control a software application on a device in communication with the input apparatus.

Optionally, the body part is remote or distal from the input apparatus. Advantageously the input apparatus can be operated by a user body part which is not in contact with the input apparatus.

Optionally, the body part is at least one body part selected from the group consisting of: (i) head, (ii) face, (iii) hand, (iv) finger, (v) foot, and (vi) leg.

A seventh aspect of the present disclosure provides a method of providing input to a device using a handheld controller. The controller comprising an outer case having a plurality of faces including a front face and a top face. The controller comprising a plurality of controls located on the front face and the top face of the controller. The controller being shaped to be held in both hands of a user such that the user's thumbs are positioned to operate controls located on the front of the controller and the user's index fingers are positioned to operate controls located on the top of the controller. The controller further comprises at least one distal input control device comprising an interface located in one of the plurality of faces of the controller. The method comprises holding the controller in at least one hand, detecting a user input from a body part remotely of the controller with the distal input device, analyzing the user input, and initiating an action in a software application executable upon the device with which the controller is in communication.

Further features and advantages of the present invention will be apparent from the specific embodiments illustrated in the drawings and discussed below.

Within the scope of this application it is envisaged or intended that the various aspects, embodiments, examples, features and alternatives set out in the preceding paragraphs, in the claims and/or in the following description and drawings may be considered or taken independently or in any combination thereof.

Features or elements described in connection with, or relation to, one embodiment are applicable to all embodiments unless there is an incompatibility of features. One or more features or elements from one embodiment may be incorporated into, or combined with, any of the other embodiments disclosed herein, said features or elements extracted from said one embodiment may be included in addition to, or in replacement of one or more features or elements of said other embodiment.

A feature, or combination of features, of an embodiment disclosed herein may be extracted in isolation from other features of that embodiment. Alternatively, a feature, or combination of features, of an embodiment may be omitted from that embodiment.

BRIEF DESCRIPTION OF THE DRAWINGS

Exemplary embodiments of the invention will now be described with reference to the accompanying drawings, in which.

DETAILED DESCRIPTION

Figure 1A:
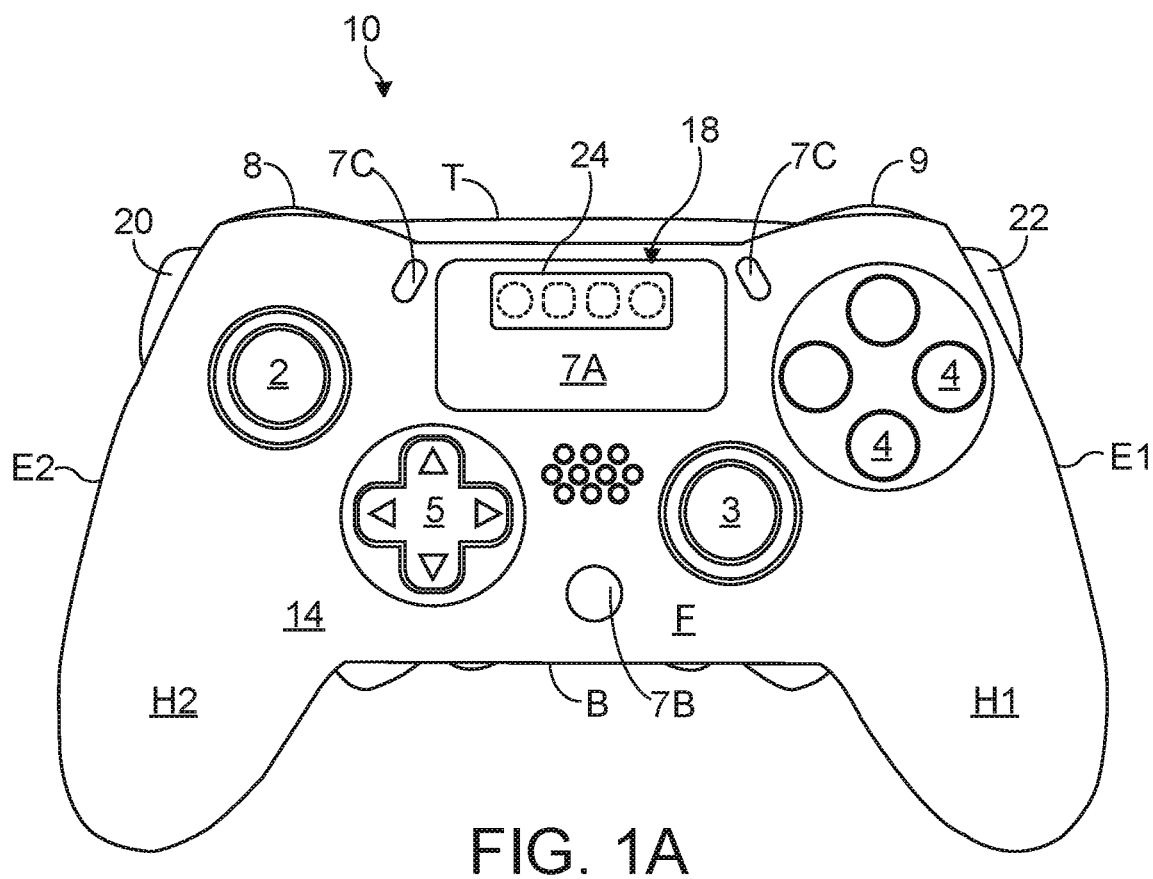
FIG. 1A is a schematic illustration of the front of an input apparatus for a games console controller according to an embodiment of the present disclosure.

Detailed descriptions of specific embodiments of an input apparatus, a controller, an additional control component and a method are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the input apparatus, the controller, the additional control component and the method described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention Referring to FIG. 1A there is shown a plan view from above of the front of an input apparatus 10 for a use with a computer. The input apparatus 10 illustrated takes the form of a controller 10 or game pad 10 for use with a video games console, local computing device, cloud-based computing device or similar. In other embodiments the input apparatus 10 may take the form of a handheld games console or other mobile device such as but not limited to a smartphone, tablet computer, phablet or the input apparatus 10 may be an accessory device (such as, but not limited to, a sleeve or case) for use with such a mobile device.

The apparatus or controller 10 comprises an outer case or shell 14. The case 14 may comprise one or more panels fitted together and or mounted to a chassis member. The case 14 may comprise a front body panel and a rear body panel. The outer case 14 comprises a void in which electronic components (such as, but not limited to, switches and/or sensors) are located.

Figure 2:
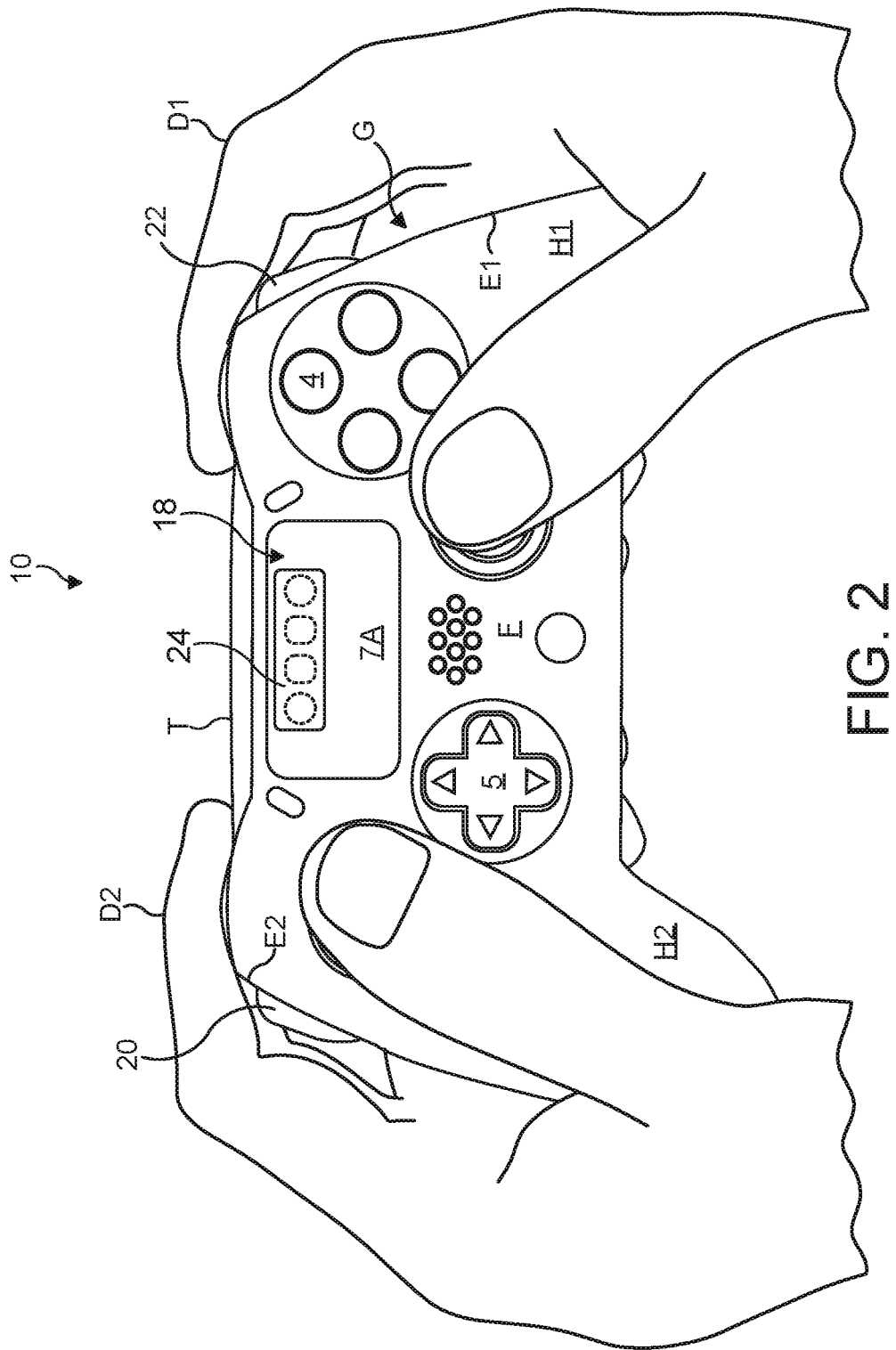
FIG. 2 is a schematic illustration of the input apparatus of FIG. 1 being held by a user.

The apparatus or controller 10 comprises a plurality of controls which are mounted to the front F and to the top T of the controller 10. As used herein the term "front" refers to an upper surface of the controller 10 when in normal use held in both hands, as shown in FIG. 2, whilst the term "top" refers to a leading edge of the controller 10 which typically faces away from a user when held in both hands. A rear or back R of the controller opposes the "front" and typically will form a lower surface, whilst the term "bottom" B refers to a trailing edge of the controller 10 which typically faces towards the user when held in both hands. The controller 10 comprises a plurality of buttons which when activated initiate a specific action or control function. The controller 10 comprises at least one omnidirectional control stick or button which is operable to provide directional input.

Specifically, in the illustrated example shown, the controller 10 comprises first, left, and second, right, analogue control sticks, also known as thumb sticks 2, 3. The first left 2 and second right 3 thumb sticks normally control movement and are intended to be operated by the user's left and right thumbs respectively. Left and right thumb sticks 2, 3 are mounted to the front face F of the controller 10. The left thumb stick 2 is located in a forward (or upper i.e. nearer the top T of the controller 10) left region of the front face F; and right thumb stick 3 is located in a rearward (or lower i.e. nearer the bottom B of the controller 10) right region of the front face F, although the thumb sticks 2,3 may be arranged differently than illustrated in other embodiments. There are four buttons 4, located on a forward (or upper i.e. nearer the top T of the controller 10) right portion of the front face F of the controller 10. The four buttons 4 normally control additional actions and are intended to be operated by the user's right thumb. There is a direction pad 5 located on the rearward (or lower) left portion of the front face F of the controller 10, although in different embodiments the direction pad 5 may be located in a different location (such as where thumb stick 2 is located in FIG. 1A). The direction pad 5 is intended to be operated by the user's left thumb, typically either as an alternative to the left thumb stick 2 or to provide additional action controls. A left shoulder button or bumper 8 and a right shoulder button or bumper 9 are located on the top face T of the controller 10. A left trigger and a right trigger may also be located on the top face T of the controller 10. The left and right triggers are typically operated by a user's index fingers. The left and right bumpers 8, 9 may also be operated by a user's index fingers. The left and right triggers may be analogue in nature, or may comprise a plurality of discrete digital states, that is to say the input control may be dependent upon the degree of depression or displacement of the trigger body.

In order to operate any of the buttons 4 a user will normally remove their right thumb from the right thumb stick 3 so as to depress one or more of the buttons 4. Switching between the right thumb stick 3 and the buttons 4 takes time since the user's thumb must traverse the distance therebetween. This may also cause a loss of, or reduction in, control in some games because the user has to relinquish control over the right thumb stick 3 in order to control the buttons 104. This may be a particular problem in games where the right thumb stick 3 is used for aiming. A similar problem may arise in games where the direction pad 5 provides additional actions and the user has to remove their left thumb from the left thumb stick 2 in order to operate the direction pad 5.

The controller 10 may comprise one or more additional input controls 7B, 7C, 18 the controls 7B, 7C may take the form of one or more digital or analogue buttons.

The additional input control 18 may comprise a first, contact or proximal, input device 7A. The additional input control 18 may also comprise a second, distal input device 24. The distal input device 24 does not require physical contact between the user and device.

The additional input control 18 may comprise, at least one gesture recognition device, and in the illustrated embodiment the additional input control 18 comprises two gesture recognition devices at least one of which is a distal input device 24.

The additional input control 18 may comprise a touch pad 54 for contact or proximal input, the touch pad 54 may provide a first gesture recognition device. The exemplary touch pad 54 comprises sensing surface and may be a capacitive touch pad, capable of registering or detecting an input or gesture from the user via contact or near contact between the user and touch pad 54. In other embodiments the touch pad 54 may be a resistive touchpad. In still other embodiments touchpad 54 may be an inductive touch pad, and the user may be required to wear an item in order to interact with the touchpad. The touch pad 54 may be capable of detecting presence of the user when disposed in close proximity to the touchpad 54, close proximity may be less than or equal to about 10 mm, optionally may be less than or equal to about 5 mm and may be about 3 mm or less. The touch pad 54 is coupled to a processing unit 58, the processing unit 58 receives a signal or information from the touch pad 54 and comprises detector capable of sensing touch input from the sensing surface and generating sensed data in accordance with a coordinate system. The touch pad 54 may be capable of sensing single touches, multiple simultaneous touches and movement of those touches or gestures across or upon the sensing surface.

In some embodiments, the distal input device 24 may comprise an image capture device coupled to an image analyzer 56 which may provide a second gesture recognition device. The distal input device 24 may be located separately from the additional input control 18, or as illustrated in FIG. 1A, distal input device 24 may be located with or a part of additional input control 18. The image capture device may comprise at least one sensor or camera 52A, 52B (see Figure IB) for detection of an object distal from the controller 10. The additional input control 18 may comprise two sensors or cameras 52A, 52B. The, or each, sensor 52A, 52B may be arranged to capture an image of an object; for example, but not limited to, a body part of the user. The sensors may be any sensor capable of capturing an image, for example but not limited to a CCD (charge-coupled device) sensor or CMOS sensor (complementary metal-oxide-semiconductor).

The distal input device 24 may be arranged to capture images of a user's face or of their hand or fingers. The user may hold the controller 10 in one hand and perform a gesture with the other hand generally above the controller 10. The distal input device 24 may also or instead capture images of the user's head or face performing gestures such as but not limited to nodding, turning, blinking, movements of the mouth or tongue or facial expressions.

The user may operate the controller 10 holding the controller in one or both hands. The user may hold the controller in one hand while remotely providing input with the other hand. The distal input device 24 detecting movement or gestures of the remote hand. In other embodiments, the user may place the controller 10 at rest on a surface for unheld operation.

The distal input device 24 may comprise at least one light source 50A, 50B. The exemplary additional input control 18 of FIG. 1A may comprise a distal input device 24 with two light sources 50A, 50B. The term 'light' as used herein includes any electromagnetic (EM) radiation, it may or may not be in the visible spectrum and may be broadband, narrowband or a single wavelength. The light sources may be infrared light sources such as infrared light emitting diodes (LED). The sensors or cameras 52A, 52B may be sensitive or enhanced to capture infrared radiation.

The distal input device 24 may comprise at least one filter 53A, 53B. The filters 53A, 53B may be arranged to filter light outside of a specified bandwidth, for example the filters may permit infrared radiation, or portion or the infrared spectrum, to be transmitted to the camera and prevent or inhibit transmission of light outside the infrared portion of the spectrum or at least portions of the EM spectrum proximate to the portion of the infrared spectrum in use.

In embodiments in which the additional input control 18 comprises both the first, contact or proximal, input device 7A and the second, distal, input device 24 the touchpad 54 is arranged to be invisible to the light spectrum employed by the cameras 52A, 52B and light sources 50A, 50B, that is to say the touchpad 54 allows transmission therethrough of light in the operational spectrum.

Whereas in the embodiment illustrated in FIG. 1A the distal input device 24 is mounted internally of the contact input device 7A or touchpad 54, that is to say distal input device 24 is mounted below or behind that the contact input device 7A or touchpad 54, in other embodiments the distal input device 24 may be mounted in a different location, and the outer case 14 may comprise an interface in the form of an opening or window exposing the cameras or sensors to the EM spectrum in use. In those embodiments comprising plurality of sensors or cameras the case may comprise a plurality of opening or windows and may comprise an opening or window for each of the plurality of sensors or cameras. The sensors may be distributed over the front F of the controller 10. The sensors may be located in a region not normally held or obscured by the user's hands when the controller is in use.

In some embodiments the additional input control 18 may be adjustably mounted, such as, but not limited to pivotally mounted, to the controller 10, for example the orientation of the additional input control 18 may be adjusted to change the field of view of the distal input device 24, or to optimize the position and/or orientation of the contact or proximal input device 7A with respect to the users hand.

One or both of the contact input device 7A and distal input device 24 (also referred to herein as a first input device 7A and second input device 24) may be removable or detachable.

The distal input device 24 may be provided by an add-on module, detachably coupled or connected to the controller 10. In some embodiments the detachable module may comprise both distal input device 24 and the contact input device 7A or touchpad 54. A communications device (wired or wireless) may be provided to enable communication between the controller 10 and the detachable module.

In some embodiments, the detachable module may comprise a power source or means connecting to a power source which power source may be external to the controller 10. The user may position or locate the detachable module remotely from the controller 10, the detachable module may be positioned or oriented to optimize the field of view, for example but not limited to, the field of view of the detachable module may be directed towards the feet or legs of the user for example placed on a floor or surface in front of the user and aimed towards the user, alternatively the detachable module may be mounted to a screen or monitor an aimed towards the head or face of the user.

In still other embodiments an array of modules may be positioned about the user each in communication with the controller 10.

In still other embodiments the controller 10 may comprise removable face plate or cover portion.

A cover portion may be attached to the controller 10 to obscure or inhibit access to the additional input control 18 so as to disable or render the additional input control 18 ineffective.

A first face plate or cover portion maybe interchange able with a second face plate or cover portion. The first face plate or cover portion comprising an access opening or window so to enable interaction with additional input control 18 and the second face plate or cover portion being arranged to obscure or inhibit interaction with the additional input control 18 so as to disable or render the additional input control 18 inoperable.

In yet further embodiments the controller may comprise an interchangeable faceplate or cover portion which incorporate a filter 53A, 53B and/or sensor 52A, 52B. In some implementations, the operational spectrum may be adjusted by changing the faceplate or cover portion to employ a filter with different transmission characteristics and/or sensor with different reception or detecting characteristics.

The distal input device 24 may comprise at least one lens 55A, 55B for focusing light onto the camera 52A, 52B.

WO2014/018836 to Holz discloses an exemplary object detection and tracking system which may be employed as the distal input device 24.

Figure 1C:
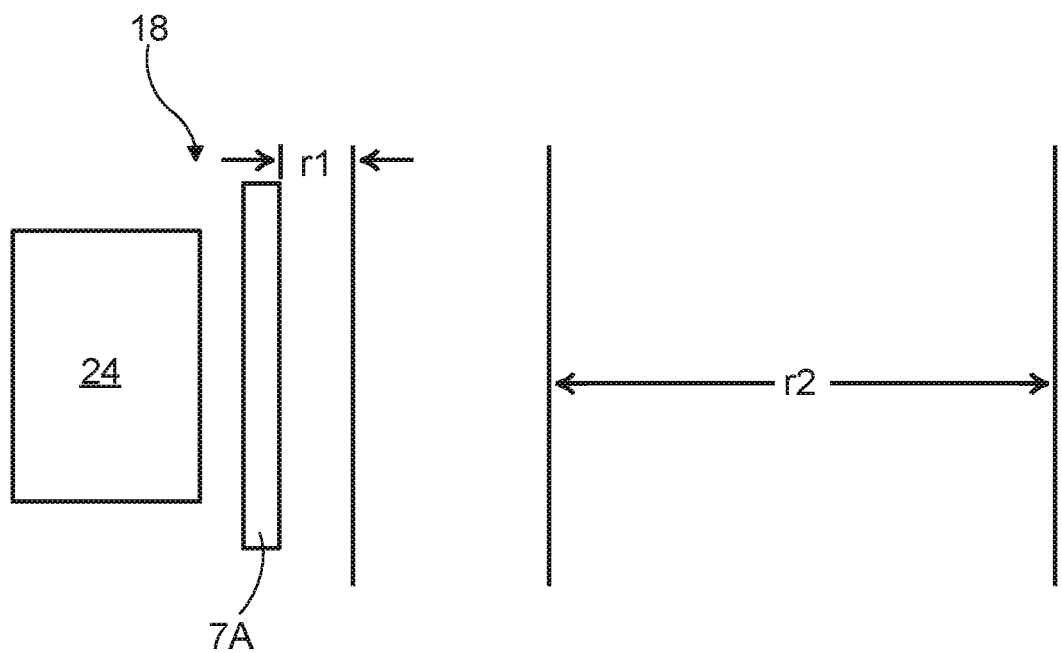
FIG. 1C is a schematic illustration of the control apparatus of FIG. 1B showing the operational ranges of first and second devices.

The additional input control 18 comprises a second processing unit 60, which interprets data from the distal input device 24 and/or the contact input device 7A. The second processing unit 60 may comprises a memory unit. The memory unit may store or record input data from each of the first and second input devices 7A, 24. The memory unit may comprise a library of reference data. The second processing unit 60 may compare the input data from the first or second input device 7A, 24 with the reference data in order to interpret an action to be taken by the controller 10 or a control function of the controller 10. In this way the controller 10 can receive an input from the user, either a contact input or a non-contact input (non-contact input is to be understood as any input outside of the range r1 (see FIG. 1C) of the touchpad 54, this may be derived from one or more capture images). The distal input device 24 comprises a second operation range r2 which is outside the operational range of the touchpad 54. The controller 10 can initiate a control function in a software application or device to which the controller 10 is coupled; said control function may then be displayed or presented to a user on or by an output device such as, but not limited to, a display device or screen, audio device or speaker or a haptic feedback device for example, but not limited to, a rumble or vibration motor or haptic glove.

In the illustrated embodiment, the operational range r2 of the distal input device 24 is outside the operational range r1 of contact input device 7A, in other embodiments the operational range r2 of the distal input device 24 may overlap with the operational range r1 of contact input device 7A so as to effectively extend the range of the additional input control 18.

In the illustrated embodiment, a region exists between the operational range r2 of the distal input device 24 and the operational range r1 of contact input device 7A. The additional input control 18 is insensitive to input in this region, it is a dead zone or unsensed region. The distal input device 24 may be capable of detecting light in the unsensed region the image may be blurred or out of focus so as to reduce the accuracy or reliability of any image analysis to the extent that object recognition and tracking is impaired.

In other embodiments, the additional input control 18 may comprise an autofocus system, manual focus device or lens mounting system to provide for addition, removal or interchange of lenses; in this way the operational range r2 of the distal input device 24 may be adjusted.

In some embodiments a first user may interact with the controller 10 to initiate an output which is presented to a second user. For example, a haptic output may be presented to the second user via a second controller or other device, a visual or audio output may be displayed or presented upon a display or audio device to the second user.

The additional input control 18 may be configured such that the gesture or sensed input replicates a control function of one of the other controls 2, 3, 4, 5, 8, 9, 20, 22 provided on the controller 10.

The additional input control 18 may be configured such that the gesture or sensed input initiates a new control function or action. For example, the additional input control 18 may sense that a user turned their head away from the controller 10 or a display device and pause a software application or initiate a save command to preserve the current state of the software application.

In order to operate the controls mounted upon the top T of the controller 10 a user will normally wrap their index fingers about the side edges or walls E1, E2 of the controller case 14, as shown in FIG. 2. In FIG. 2 the index finger D1, D2 are bent or crooked about forward or leading corners of the controller 10.

The user can operate either the left shoulder button 8 or left trigger with the index finger D2 of their left hand and can operate either the right shoulder button 9 or right trigger with the index finger D2 of their right hand (see FIG. 2).

The user may place the pad of the end of their index fingers on the controls on the top of the controller 10. When doing so the user index fingers may leave a gap G between side walls E1, E2 of the controller case 14 and the adjacent index finger D1, D2.

Optionally, the controller 10 may comprise an actuator or additional control 20, 22 upon at least one of the side walls E1, E2 of the controller case 14 proximate the top or leading-edge T of the controller 10. The additional controls 20, 22 may be disposed in an upper region of the side walls E1, E2 of the controller case 114m that is to say proximate the front F of the controller 10. The additional controls 20, 22 are disposed in the crook of a respective one of the index fingers D1, D2, the additional controls 20, 22 may at least partially fill the gaps G.

The additional control 20, 22 are arranged to be operated by a user engaging or pressing the control with one of the phalanges of the index finger D1, D2, preferably the user's proximal phalanx or rather the fleshy part thereabout.

In some embodiments, the additional control 20, 22 may be operated by the middle phalanx of the index finger D1, D2. This may be more common when the user's hand is smaller in size.

In this way the additional controls 20, 22 are operable by an intermediate portion of the user's index finger, wherein the intermediate portion is disposed between the finger pad or end of the finger and the metacarpophalangeal joint.

In contrast to the shoulder buttons 8, 9 and the triggers which are operated by bending the index finger D1, D2, the additional controls 20, 22 may be operated by a straightening action of the index finger D1, D2. In this way the user's proximal phalanx is brought towards the additional control 20, 22 so as to activate the control 20, 22.

In this way the user may operate the additional controls 20, 22 when their index finger D1, D2 is at rest upon or aligned with the shoulder button 8, 9 or 22 or when their index finger D1, D2 is at rest upon or aligned with the triggers.

The user may operate the additional controls 20, 22 without altering the alignment of their index finger with whichever of the front controls, shoulder button or trigger, that their index finger is poised over.

The additional control 20 may replicate the function operated by either the left shoulder button 8 or left trigger 6. The additional control 20 may replicate the function of one of the controls disposed on the front of the controller 10 for example, but not limited to, buttons 4.

The additional control 22 may replicate the function operated by either the right shoulder button 9 or right trigger. The additional control 22 may replicate the function of one of the controls disposed on the front of the controller 10 for example, but not limited to, buttons 4.

Alternatively, the additional controls 20, 22 may control a new command function.

In some embodiments, activation of one of the additional controls 20, 22 may change the command function or operation initiated by one of the other controls provided on the controller. When said one of the additional controls 20, 22 is in a first, "on" state the other control when actuated may initiated a first command function, whereas when said one of the additional controls 20, 22 is in a second, "off" state the other control when actuated may initiated a second, different, command function In an alternative embodiment the control 20, 22 may be replaced with a sensor mounted on the side walls E1, E2 of the controller 10 in same the location as the controls 20, 22. The sensor may take the form of a capacitive or resistive touch pad. In other embodiments it may be an optical sensor. In yet other embodiments, one or more of controls 20, 22 may be an additional input control 18 or a distal input device 24. The sensor may be arranged to be substantially flush with the outer surface of the controller side walls. This may reduce the likelihood of accidental activation of the additional control 20, 22. The sensor may be activated by bringing the users finger into close proximity or touching contact with the sensor, or by gesture recognition as discussed above.

Figure 1B:
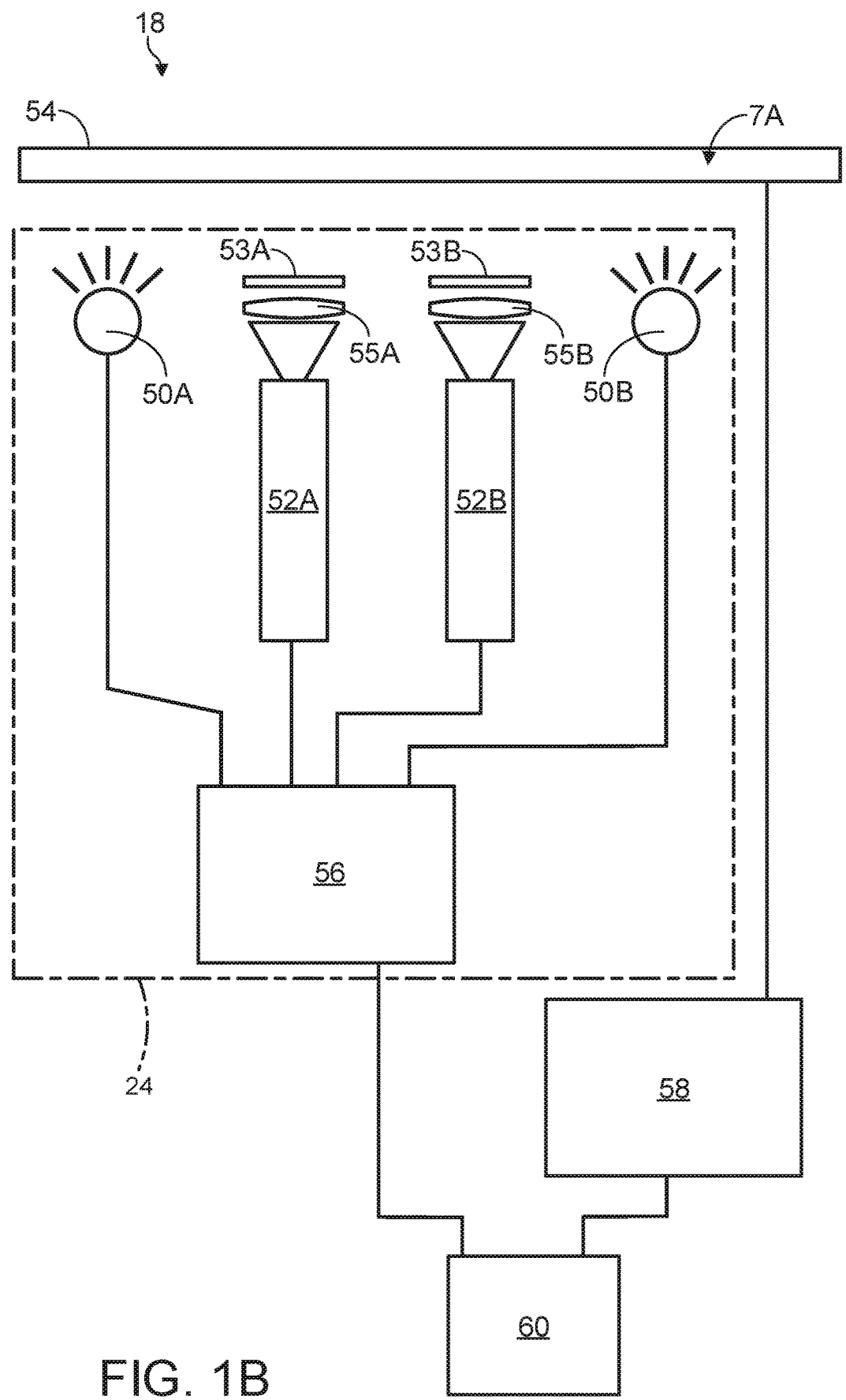
FIG. 1B is a schematic illustration of a control apparatus for use with embodiments of the present disclosure.
Figure 3A:
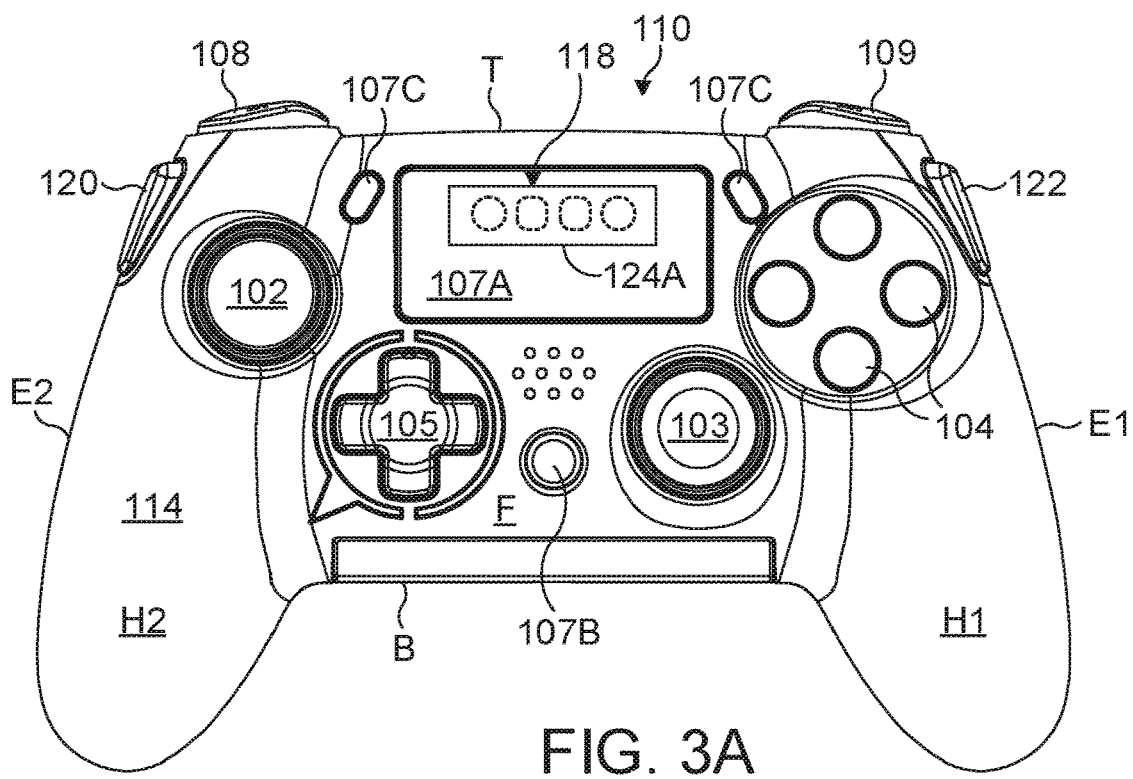
FIG. 3A is a plan view from above of the front of an input apparatus for a games console controller according to another embodiment of the present disclosure.
Figure 3B:
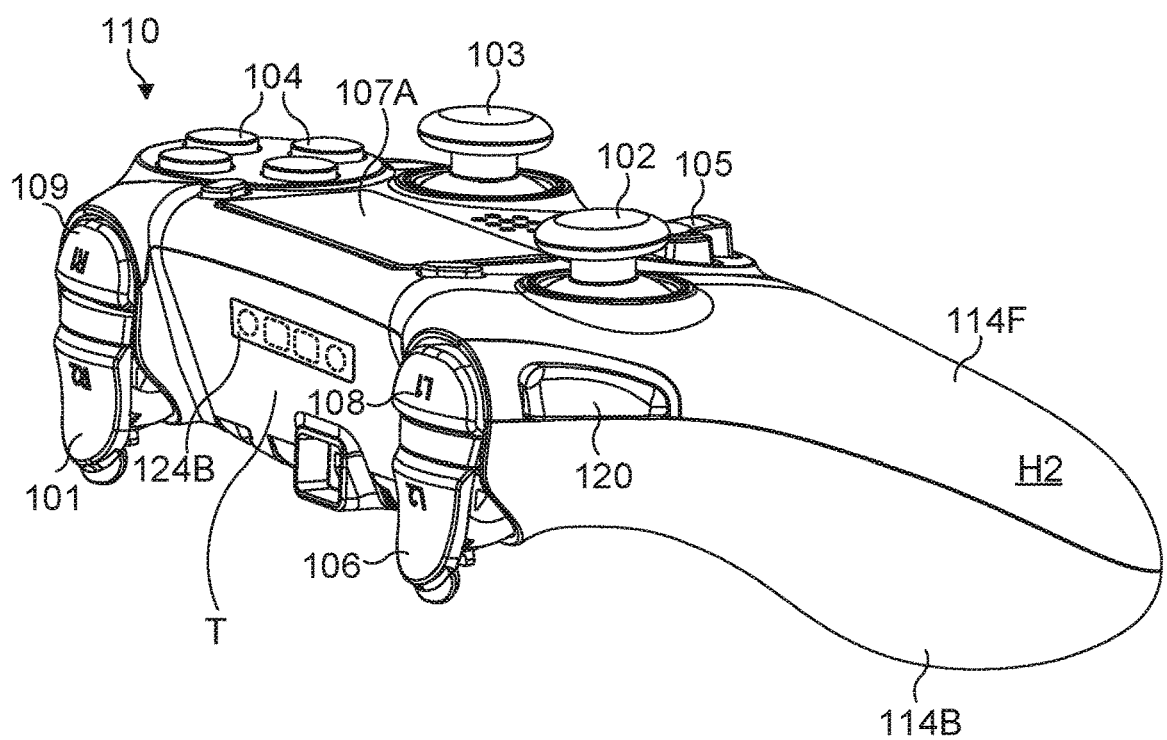
FIG. 3B is a plan view from above of the front of the input apparatus of FIG. 3A.

Referring now to FIGS. 3A and 3B, there is shown an alternative embodiment of the present disclosure. In the second illustrated embodiment like numerals have, where possible, been used to denote like parts, albeit with the addition of the prefix "100" to indicate that these features belong to the second embodiment. The alternative embodiment shares many common features with the first embodiment and therefore only the differences from the embodiment illustrated in FIGS. 1A to 2 will be described in any greater detail.

FIGS. 3A and 3B show a controller 110 having first, left, and second, right, analogue control sticks, also known as thumb sticks 102, 103. The first left 102 and second right 103 thumb sticks normally control movement and are intended to be operated by the user's left and right thumbs respectively. Left and right thumb sticks 102, 103 are mounted to the front face F of the controller 110. The left thumb stick 102 is located in a forward (or upper i.e. nearer the top T of the controller 110) left region of the front face F; and right thumb stick 103 is located in a rearward (or lower i.e. nearer the bottom B of the controller 110) right region of the front face F. There are four buttons 104, located on a forward (or upper i.e. nearer the top T of the controller 110) right portion of the front face F of the controller 110. The four buttons 104 normally control additional actions and are intended to be operated by the user's right thumb. There is a direction pad 105 located on the rearward (or lower) left portion of the front face F of the controller 110. The direction pad 105 is intended to be operated by the user's left thumb, typically either as an alternative to the left thumb stick 102 or to provide additional action controls. A left shoulder button or bumper 108 and a right shoulder button or bumper 109 are located on the top face T of the controller 110. A left trigger 106 and a right trigger 101 may also be located on the top face T of the controller 110. The left and right triggers 106, 101 are typically operated by a user's index fingers. The left and right bumpers 108, 109 may also be operated by a user's index fingers. The left and right triggers 106, 101 may be analogue in nature, or may comprise a plurality of discrete digital states, that is to say the input control may be dependent upon the degree of depression or displacement of the trigger body.

The controller 110 comprises a chassis or frame member to which a front case panel 114F and rear case panel 114*b* are mounted.

The controller 110 may comprise one or more additional inputs 107B, 107C, 107A, 124A, 124B and the controls 107B, 107C may take the form of one or more digital or analogue buttons.

The controller 110 may comprise an additional input control 118 having a first, contact or proximal, input device 107A. The additional input control 118 may comprise a second, distal, input device 124A. The distal input device 124A does not require physical contact between the user and device, The additional input control 118 may comprise at least one gesture recognition device, and in the illustrated embodiment the additional input control 118 comprises two gesture recognition devices, at least one of which is a distal input device 124A.

The additional input control 118 may comprises a touch pad for contact or proximal input, the touch pad may provide a first gesture recognition device. The touch pad may be capable of detecting presence of the user when disposed in close proximity to the touchpad. The touch pad may be capable of sensing single touches, multiple simultaneous touches and movement of those touches or gestures across or upon the sensing surface.

In some embodiments, the distal input device 124A may comprise an image or motion capture device or sensor and an analyzer which may provide a second gesture recognition device.

The controller 110 may comprise a further distal input device 124B, also referred to herein as forward-facing distal input device 124B. The forward-facing distal input device 124B is mounted to (or operably exposed through an opening or window in located in) the top T of the controller 110 and may be located between the left and right trigger 106,101 or left and right shoulder buttons 108, 109.

The further distal input device 124B is arranged to provide a different field of view to the distal input device 124A in the front F of the controller 110.

In some embodiments the forward-facing distal input device 124B may be mounted to a detachable cover portion such as, but not limited to, a battery compartment closure or cover.

Whereas the distal input device 124A is arranged to detect and track an object disposed substantially above the front face F of the controller 110, the forward facing distal input device 124B is capable of detecting and tracking an object disposed in front of the controller 110 for example the forward facing distal input device 124B may be a capable of detecting and tracking the legs and/or feet of the user. The user may then employ one or both legs and/or feet to provide input to the controller 110.

Figure 4:
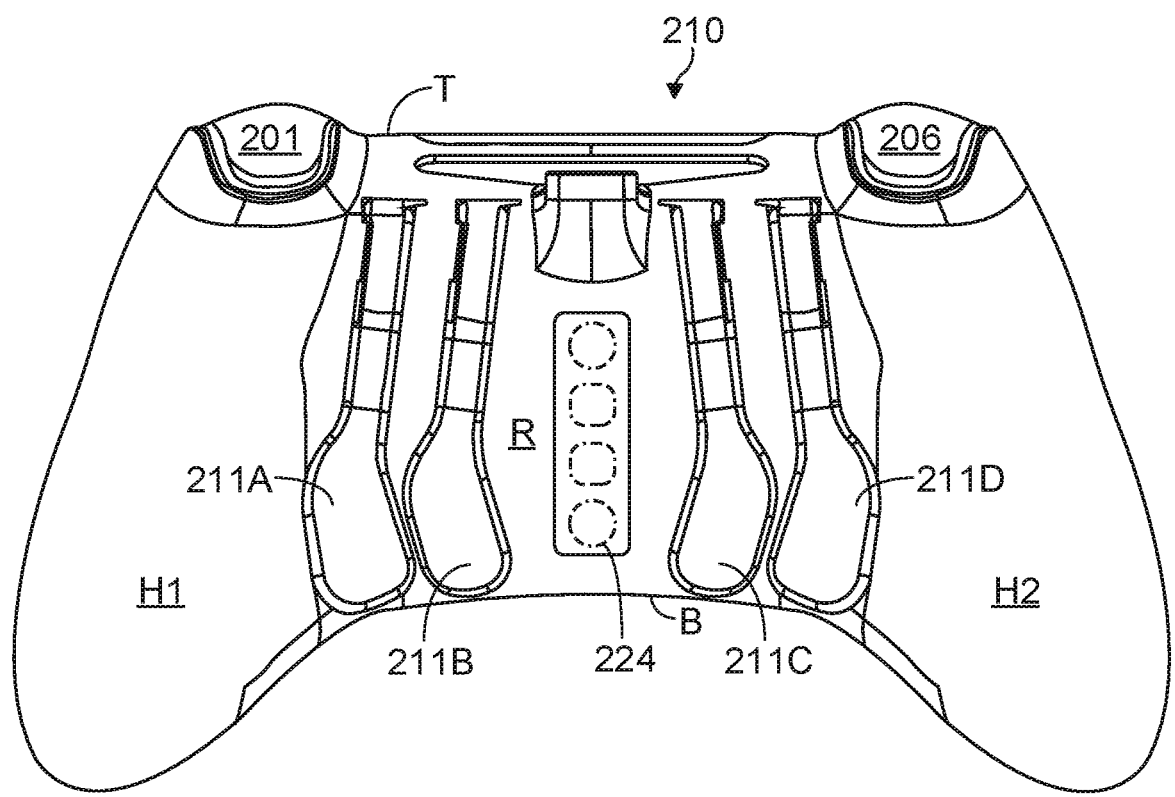
FIG. 4 is a plan view from below of the back or rear of an input apparatus for a games console controller according to yet another embodiment of the present disclosure.
Figure 5:
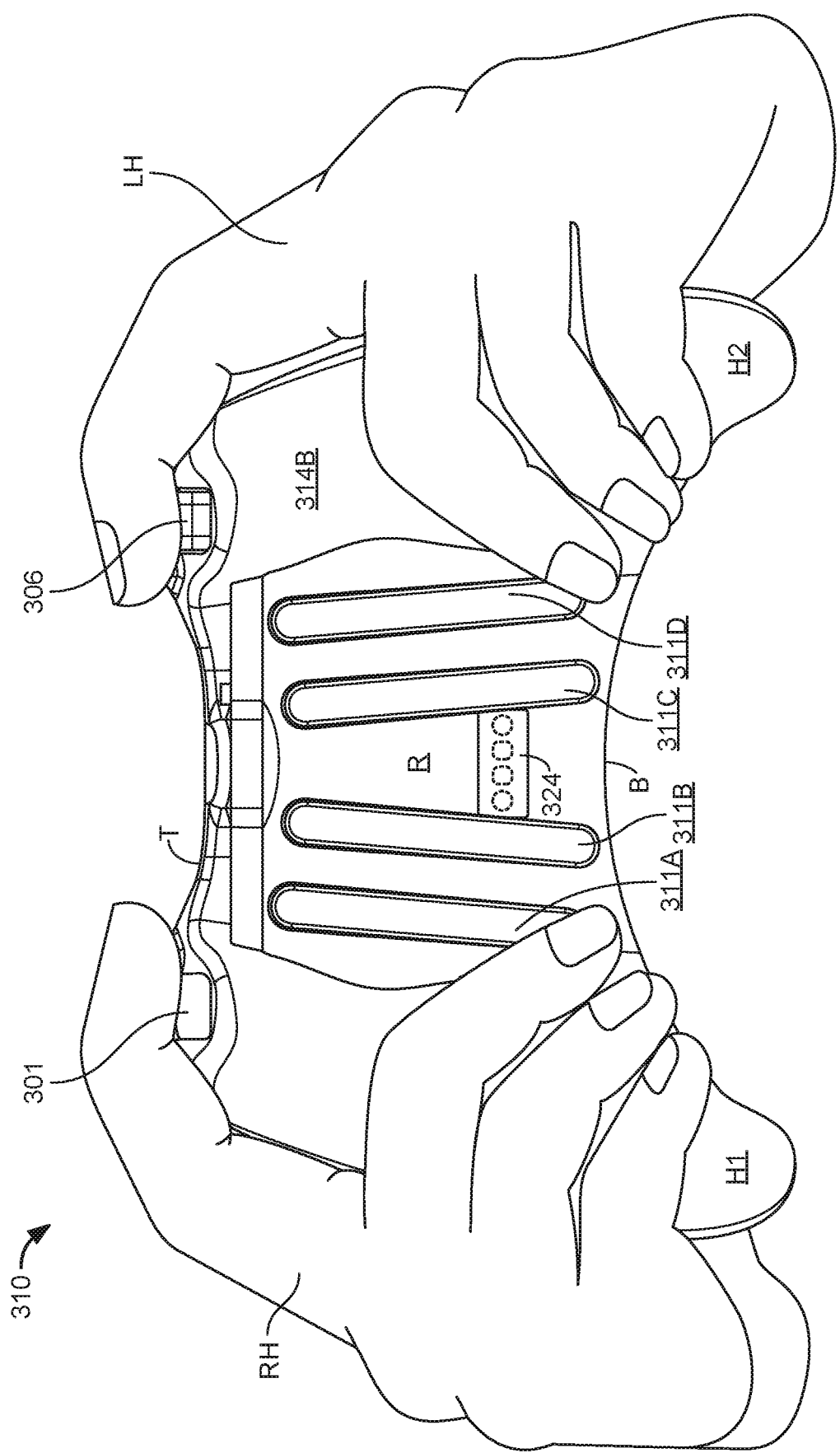
FIG. 5 is a plan view from below of the back or rear of an input apparatus for a games console controller according to still another embodiment of the present disclosure, the controller is being held by a user.
Figure 6:
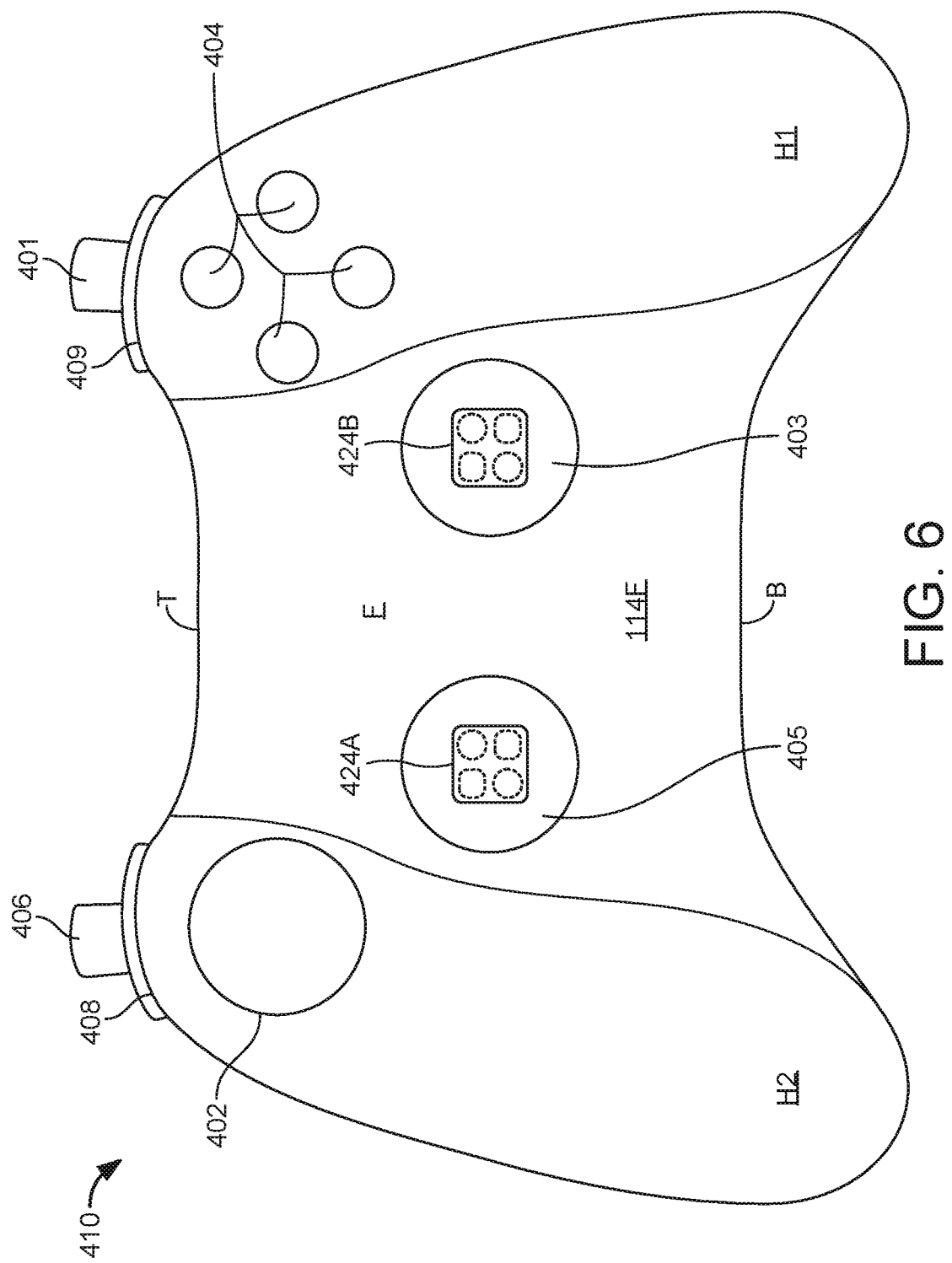
FIG. 6 is a schematic illustration of the front of an input apparatus for a games console controller according to still yet another embodiment of the present disclosure.

Referring now to FIGS. 4 to 6, there is shown an alternative embodiment of the present disclosure. In the third, fourth and fifth illustrated embodiments like numerals have, where possible, been used to denote like parts, albeit with the addition of the prefix "200", "300", "400" "to indicate that these features belong to the third, fourth and fifth embodiments respectively. The alternative embodiments share many common features with the first and second embodiments and therefore only the differences from the embodiments illustrated in FIGS. 1A to 3B will be described in any greater detail.

Referring to FIG. 4 there is shown another embodiment of the present invention in which a controller 210 may comprise one or more additional controls 211A, 211B, 211C, 211D mounted to the rear R or back of the apparatus 210, where the rear R or back face is opposite the front face (the face F, in FIG. 3A to which the buttons 104, left and right thumb sticks 102, 103 and direction pad 105 are mounted).

In the illustrated embodiment, the apparatus 210 comprises four additional controls 211A, 211B, 211C, 211D. In other embodiments, more or fewer additional controls 211A, 211B, 211C, 211D may be provided. The additional controls 211A, 211B, 211C, 211D, also referred to herein as paddle levers. Each may comprise an elongate member, that is to say the member comprises a first end and a second end the distance between the first and second ends is greater than a width of the member. The member may be bent, twisted or folded in one or more directions. The paddle levers 211A, 211B, 211C, 211D may be orientated such that at least a portion of the member is substantially parallel with respect to one of a first and second handle portions H1, H2 of the controller 210. The members are each positioned to be operable by the middle, ring or little fingers of a user. These are the fingers normally used to grasp first and second handle portion H1, H2 which thus brings them into proximity with the rear face R of the controller 210. The additional controls 211A, 211B, 211C, 211D are arranged to operate a microswitch or tact switch mounted to or in the controller 210 in registry with a portion of the additional controls 211A, 211B, 211C, 211D. The additional controls 211A, 211B, 211C, 211D may be used to provide inputs replicating the inputs provided by one or more of thumb sticks 102, 103, directional pad 105, buttons 104, triggers 101, 106, shoulder buttons 108, 109, or other input devices of controller 210 and one or more of additional controls 211A, 211B, 211C, 211D may be mapped, or remapped as desired to provide such input. Alternatively, additional controls 211A, 211B, 211C, 211D may be used to provide inputs or functions in addition to the various input devices of controller 210.

The controller 210 comprises a distal input device 224, also referred to herein as downward facing distal input device 224. The downward facing distal input device 224 is mounted to (or operably exposed through an opening or window in located in) the rear of the controller 210 and may be located between a pair of the additional controls 211A, 211B, 211C, 211D.

In some embodiments the downward facing distal input device 224 may be mounted to a detachable cover portion such as, but not limited to, a battery compartment closure or cover.

The distal input device 224 is arranged to detect and track an object disposed substantially below the rear face R of the controller 210. The downward facing distal input device 224 is capable of detecting and tracking an object disposed below of the controller 210 for example the downward facing distal input device 224 may be a capable of detecting and tracking the legs and/or feet of the user. The user may then employ one or both legs and/or feet to provide input to the controller 210. In other embodiments the downward facing distal input device 224 is capable of detecting and tracking movement of the hand or fingers below the controller 210 and may detect and track movement of those fingers which, when grasping the controller 210, are wrapped about the rear R of the controller 210.

In such embodiments, the downward facing distal input device 224 may be used by a user's middle, ring, and/or pinkie fingers to provide inputs for the game or other software application being controlled by controller 210. These inputs to distal input device 224 may be in addition to or instead of inputs provided by the user manipulating or activating additional controls 211A, 211B, 211C, 211D. Additionally, in such embodiments the downward facing distal input device 224 may be used to provide inputs replicating the inputs provided by one or more of the input devices of controller 210 such as thumb sticks 102, 103, directional pad 105, buttons 104, triggers 101, 106, shoulder buttons 108, 109, and the downward facing distal input device 224 may be mapped, or remapped as desired to provide such input. Alternatively, the downward facing distal input device 224 may be used to provide new inputs or functions in addition to or not provided by the other various input devices of controller 210.

In other embodiments, the downward facing distal input device 224 may be combined with a touch sensitive device, such as an additional input controller 18 discussed above. The touch sensitive device may comprise a sensing surface capable of detecting contact between the sensing surface and the user's finger, providing yet additional inputs for the controller 210.

In still other embodiments, more than one downward facing distal input device 224 may be implemented on (or in) any desired location of the rear surface R of controller 210 and/or on (or in) any desired location of the bottom or rear surface of one or more of handles H1 or H2. In such embodiments, one or more of the distal input devices 224 may be combined with a touch sensitive device, such as an additional input controller 18 discussed above, and may be any desired dimension and/or shape. The touch sensitive device may comprise a sensing surface capable of detecting contact or near contact between the sensing surface and the user's finger as discussed above. In such embodiments, the downward facing distal input devices 224 may replace, or may be implemented instead of, additional controls 211A, 211B, 211C, 211D. In such embodiments the downward facing distal input devices 224 may be used to provide inputs replicating the inputs provided by one or more of the input devices of controller 210 such as thumb sticks 102, 103, directional pad 105, buttons 104, triggers 101, 106, shoulder buttons 108, 109, and the downward facing distal input devices 224 may be mapped, or remapped as desired to provide such input. Alternatively, the downward facing distal input devices 224 may be used to provide new inputs or functions in addition to or not provided by the other various input devices of controller 210.

Referring to FIG. 5 there is shown another embodiment of the present invention in which a controller 310 is shown held in the hands LH, RH of a user. In this embodiment, the controller 310 comprises a distal input device 324, also referred to herein as downward facing distal input device 324. The downward facing distal input device 324 is mounted to (or operably exposed through an opening or window in located in) the rear of the controller 310, albeit in different orientation to that of FIG. 4, and may be located between a pair of additional controls 311A, 311B, 311C, 311D mounted to the rear of the controller 310.

In some embodiments one or more of the additional controls 311A, 311B, 311C, 311D are detachably mounted to the rear of the controller 310. The downward facing distal input device 324 in such embodiments may be arranged to be located substantially behind the one or more of removable additional controls 311A, 311B, 311C, 311D, in this way the downward facing distal input device 324 is operational only when the one or more of removable additional controls 311A, 311B, 311C, 311D is removed. In such embodiments the one or more of removable additional controls 311A, 311B, 311C, 311D obscure or inhibit light from being transmitted or received by the downward facing distal input device 324.

In still other embodiments the downward facing distal input device 324 may be combined with a touch sensitive device. The touch sensitive device may comprise a sensing surface capable of detecting contact between the sensing surface and the additional controls 311A, 311B, 311C, 311D.

FIG. 6 shows plan view from above of an alternative input apparatus or controller 410 for use with a computer, games console, mobile device, cloud-based system, or other computing device.

The controller 410 comprises a first, left, touch sensitive device 405 and second, right, touch sensitive device 403 (also referred to herein as first and second touch sensitive devices 405, 403). The touch sensitive devices 405, 403 have replaced the analogue control sticks, also known as thumb sticks of the previous embodiments. The touch sensitive devices 405, 403 can be employed to provide two-dimensional input, for example to control movement, and are intended to be operated by the user's left and right thumbs respectively. left and right touch sensitive devices 405, 403 are mounted to the front face F of the controller 410, the left touch sensitive device 405 is located in rearward (or lower-nearer the bottom face B of the controller 410) left region of the front face F and right touch sensitive device 403 is located in rearward (or lower-nearer the bottom face B of the controller 410) right region of the front face, although other arrangements of direction pad 402, left touch sensitive device 405 and right touch sensitive device 403 are possible.

The first and second touch sensitive devices 405, 403 may take the form of touch pads, in the illustrated embodiment the first and second touch sensitive devices 405, 403 are substantially circular in shape but other shapes may be employed in alternative embodiments. In some embodiments the first and second touch sensitive devices 405, 403 may be concave or dished. The first and second touch sensitive devices 405, 403 may be mounted so as to be generally inclined with respect to the controller 410. In this way the first and second touch sensitive devices 405, 403 may be ergonomically adapted to the users hand or thumbs by directing the first and second touch sensitive devices 405, 403 towards the respective thumb of the user; this may facilitate the user to maintain contact between an end of their thumb and the respective touch sensitive device 405, 403.

There are four buttons 404, located on a forward (or upper-nearer the top face T of the controller 410) right portion of the front face F of the controller 410, which normally control additional actions and are intended to be operated by the user's right thumb. There is a direction pad 402 located on the forward (or lower) left portion of the front face F of the controller 410. The direction pad 402 is intended to be operated by the user's right thumb. In an alternative embodiment the direction pad 402 may be replace with an analogue thumb stick. A left shoulder button 408 or bumper and a right shoulder button 409 or bumper are located on the top face T of the controller 410. A left trigger 406 and a right trigger 401 are also located on the top face T of the controller 410. The left and right triggers 406, 401 are typically operated by a user's index fingers. The left and right bumpers 408, 409 may also be operated by a user's index fingers. The left and right triggers 406, 401 may analogue in nature, or may comprise a plurality of discrete digital states, that is to say the input control is dependent upon the degree of depression or displacement of the trigger body.

The controller 410 comprises a first, left, distal input device 424A and a second, right, distal input device 424. The first distal input device 424A may be mounted below or behind the first touch sensitive device 405. The second distal input device 424B may be mounted below or behind the second touch sensitive device 403.

In this way the first distal input device 424A may be employed to track movement of the left thumb or hand when distant (outside the range of the touch sensitive device) from the controller 410 or first touch sensitive device 405.

The second distal input device 424B may be employed to track movement of the right thumb or hand when distant from the controller 410 or second touch sensitive device 403.

It can be appreciated that various changes may be made within the scope of the present invention. For example, the size and shape of the paddles may be adjusted to accommodate controllers of differing size or shape.

Whilst the foregoing embodiments have been described with reference to detection and tracking objects movement relative to the controller it is envisaged that the sensors or cameras may be employed to track movement of the controller relative to the user and/or to its environment or to track movement of the user relative to the environment, for example but not limited to in Virtual Reality (VR) systems, this may employed as collision avoidance or mitigation feature, the controller or other device may provide the user with information or feedback (visual, audio or haptic) to warn of an imminent collision.

In some embodiments the microswitches may be replaced with a magnetic switch or sensor, for example a reed switch or hall sensor; the paddles may comprise a magnet arranged so as to activate the magnetic switch or sensor when the paddle is depressed by a user. It is envisaged that in such embodiments the magnetic switch or sensor is mounted inside the controller behind the back panel and that there will be no requirement to provide apertures through the back panel in order that the paddles or controls can physically contact the microswitches. Further it is envisaged that the user may be provided with feedback to indicate that the switch has been activated. The feedback may be aural or haptic, for example, such as an audible click.

It is envisaged that the controllers may be coupled to a games console or computer by a wired connection or by a wireless connection device.

It is also envisaged that the controller may be constructed as a shell or caddy into which a hand-held electronic device such as, but not limited to, a mobile telephone (smartphone) or tablet computer is inserted, the caddy comprising control actuators, thumb sticks and/or buttons (which are coupled to the electronic device either wirelessly or via physical or wired connection) for interaction with or control of the electronic device.

It will be recognized that as used herein, directional references such as "top", "bottom", "front", "back", "end", "side", "inner", "outer", "upper" and "lower" do not limit the respective features to such orientation, but merely serve to distinguish these features from one another.

The invention claimed is:

1. An input apparatus for a computer, the input apparatus comprising: an outer case having a plurality of faces including:
    a front face,
    a rear face opposite the front face, and a top face;
    a plurality of front controls located on the front face of the input apparatus and a plurality of top controls located on the top face of the input apparatus, wherein the input apparatus is configured to be held in both hands of a user such that thumbs of the user are positioned to operate front controls and index fingers of the use are positioned to operate the top controls;
    an input sensing device having a sensing surface located on one of the plurality of faces and configured to capture a first user input from a first motion at a distance r1 from the sensing surface;
    a distal input control device configured to capture a second user input through the sensing surface from a motion located at a second distance r2 from the sensing surface, where r2 is greater than r1; and
    an additional input sensing device in communication with the sensing surface and configured to capture a third user input from a pressing of the sensing surface.

2. The input apparatus of claim 1, wherein the input sensing device comprises a touch sensitive device having a touch sensing surface.

3. The input apparatus of claim 1, wherein the distal input control device comprises a first gesture recognition device and the input sensing device comprises a second gesture recognition device.

4. The input apparatus of claim 3, wherein distance r1 is greater than zero.

5. The input apparatus of claim 1, wherein the distal input control device is located internally of the outer case.

6. The input apparatus of claim 1 wherein the distal input control device is disposed below the sensing surface.

7. The input apparatus of claim 6, wherein the distal input control device comprises a camera having an image sensor for capturing at least one image and an image analyzer.

8. The input apparatus of claim 1, wherein the first, second, and third user inputs are control inputs to a program operating on the computer.

9. The input apparatus according to claim 2, wherein the program is a game.

10. The input apparatus of claim 1, wherein the input apparatus is a gaming controller for controlling a game program.

11. The input apparatus according to claim 1 wherein the input apparatus comprises:
- a plurality of additional distal input control devices to capture additional user inputs each additional distal input control device comprising:
  - an interface; and
  - a camera located and oriented to provide field of view, the camera having an image sensor for capturing at least one image of the field of view; and
  - an image analyzer,
- wherein each camera of the plurality of additional distal input control devices captures one of a plurality of fields of view.

12. An input apparatus for a computer, the input apparatus comprising: an outer case having a plurality of faces including:
- a front face,
- a rear face opposite the front face, and a top face;
- a plurality of front controls located on the front face of the input apparatus and a plurality of top controls located on the top face of the input apparatus, wherein the input apparatus is configured to be held in both hands of a user such that thumbs of the user are positioned to operate front controls and index fingers of the user are positioned to operate the top controls;
- a touch sensitive device having a sensing surface located on one of the plurality of faces and configured to capture a first user input;
- a distal input control device configured to capture a second user input from a motion located at a non-zero distance r from the sensing surface wherein an interface of the distal input control device comprises at least a portion of the sensing surface; and
- an activation recognition device disposed beneath the touch sensitive device and configured to capture a third user input when the sensing surface is pressed by the user.

13. The input apparatus of claim 12, wherein the touch sensitive device is further configured to capture a fourth user input from a motion located at a non-zero distance r1 from the sensing surface, where distance r1 is less than distance r.

14. The input apparatus of claim 12, wherein the sensing surface is located on the front face of the input apparatus, and the distal input control device is configured to capture the second input from a motion of one or more body part selected from a group comprising: (i) head, (ii) face, (iii) hand, (iv) finger, or a combination thereof.

15. The input apparatus of claim 12, wherein the sensing surface is located on the rear face of the input apparatus, and the distal input control device is configured to capture the second input from a motion of one or more body part selected from a group comprising: (i) hand, (ii) finger, (iii) foot, (iv) leg, or a combination thereof.

16. The input apparatus of claim 12, wherein the input apparatus further comprises a plurality of additional controls located at the rear face of the input apparatus in a position to be activated by a middle, ring, or pinkie finger of the user.

17. The input apparatus of claim 16, wherein one or more of the additional controls comprise touch sensitive devices having a sensing surface located at the rear face of the input apparatus and configured to capture an additional input from the middle, ring, or pinkie finger of the user.

18. The input apparatus of claim 17, wherein one or more of the additional controls further comprise distal input control devices configured to capture rear inputs through the sensing surface from motions located at the non-zero distance r from the sensing surface.

19. The input apparatus of claim 12, wherein the distal input control device is located internally of the outer case and is disposed below the sensing surface.

20. A handheld controller for computers comprising:
- an outer case having a plurality of faces including:
  - a front face,
  - a rear face opposite the front face, and a top face;
- a plurality of front controls located on the front face of the handheld controller and a plurality of top controls located on the top face of the handheld controller, wherein the handheld controller is configured to be held in both hands of a user such that thumbs of the user are positioned to operate front controls and index fingers of the user are positioned to operate the top controls;
- a touch sensitive device having a sensing surface located on one of the plurality of faces and configured to capture a first user input;
- a distal input control device located internal to the outer case and disposed below the sensing surface, the distal input control device configured to capture a second user input through the sensing surface from a motion located at a non-zero distance r from the sensing surface; and
- an activation recognition device located internal to the outer case and disposed below the sensing surface, the activation recognition device configured to capture a third user input from a pressing of the sensing surface.

* * * * *